United States Patent
Zhang et al.

(10) Patent No.: US 12,085,640 B2
(45) Date of Patent: Sep. 10, 2024

(54) FUZZY LABELING OF LOW-LEVEL ELECTROMAGNETIC SENSOR DATA

(71) Applicant: Aptiv Technologies AG, Schaffhausen (CH)

(72) Inventors: Yihang Zhang, Calabasas, CA (US); Kanishka Tyagi, Agoura Hills, CA (US); Narbik Manukian, Los Angeles, CA (US)

(73) Assignee: Aptiv Technologies AG, Schaffhausen (CH)

( * ) Notice: Subject to any disclaimer, the term of this patent is extended or adjusted under 35 U.S.C. 154(b) by 352 days.

(21) Appl. No.: 17/658,089

(22) Filed: Apr. 5, 2022

(65) Prior Publication Data

US 2023/0194700 A1 Jun. 22, 2023

Related U.S. Application Data

(60) Provisional application No. 63/265,756, filed on Dec. 20, 2021.

(51) Int. Cl.
*G01S 13/90* (2006.01)
*G01S 7/41* (2006.01)
(Continued)

(52) U.S. Cl.
CPC .......... *G01S 13/9005* (2013.01); *G01S 7/417* (2013.01); *G01S 13/865* (2013.01); *G01S 13/867* (2013.01); *G06N 3/043* (2023.01); *G06N 3/08* (2013.01)

(58) Field of Classification Search
CPC .. G01S 13/9005; G01S 13/865; G01S 13/867; G01S 7/417; G06N 3/043; G06N 3/08
(Continued)

(56) References Cited

U.S. PATENT DOCUMENTS

| 10,057,083 B2 * | 8/2018 | Margon ................. H04L 67/12 |
| 2018/0053070 A1 | 2/2018 | Pavek et al. |

(Continued)

FOREIGN PATENT DOCUMENTS

| CN | 111259532 A * | 6/2020 | ............ G01D 18/00 |
| CN | 114578351 A | 6/2022 | |
| DE | 102019002662 A1 | 10/2020 | |

OTHER PUBLICATIONS

"Extended European Search Report", EP Application No. 22197741.6, Apr. 28, 2023, 7 pages.

(Continued)

*Primary Examiner* — Harry K Liu
(74) *Attorney, Agent, or Firm* — Harness, Dickey & Pierce, P.L.C.

(57) ABSTRACT

This document describes techniques and systems for fuzzy labeling of low-level electromagnetic sensor data. Sensor data in the form of an energy spectrum is obtained and the points within an estimated geographic boundary of a scatterer represented by the smear is labeled with a value of one. The remaining points of the energy spectrum are labeled with values between zero and one with the values decreasing the further away each respective remaining point is from the geographic boundary. The fuzzy labeling process may harness more in-depth information available from the distribution of the energy in the energy spectrum. A model can be trained to efficiently label an energy spectrum map in this manner. This may result in lower computational costs than other labeling methods. Additionally, false detections by the sensor may be reduced resulting in more accurate detection and tracking of objects.

20 Claims, 6 Drawing Sheets

(51) Int. Cl.
　　　*G01S 13/86*　　(2006.01)
　　　*G06N 3/043*　　(2023.01)
　　　*G06N 3/08*　　(2023.01)

(58) Field of Classification Search
　　　USPC .................................................. 342/357.31
　　　See application file for complete search history.

(56) References Cited

U.S. PATENT DOCUMENTS

| | | |
|---|---|---|
| 2019/0187268 A1 | 6/2019 | Lien et al. |
| 2020/0125112 A1* | 4/2020 | Mao ..................... G06F 18/217 |
| 2020/0219264 A1* | 7/2020 | Brunner ................ G01S 7/4808 |

OTHER PUBLICATIONS

Du, et al., "Multiple Instance Choquet Integral with Binary Fuzzy Measures for Remote Sensing Classifier Fusion with Imprecise Labels", 2019 IEEE Symposium Series on Computational Intelligence (SSCI), Dec. 6-9, 2019, pp. 1154-1162.

Nguyen, et al., "Learning Classification Models with Soft-Label Information", Journal of the American Medical Informatics Association, vol. 21, Issue 3, May 2014, pp. 501-508.

Szegedy, et al., "Rethinking the Inception Architecture for Computer Vision", 2016, pp. 2818-2826.

Zhang, et al., "Co-saliency Detection via Mask-guided Fully Convolutional Networks with Multi-scale Label Smoothing", 2019, pp. 3095-3104.

* cited by examiner

FUZZY LABELING OF LOW-LEVEL ELECTROMAGNETIC SENSOR DATA

CROSS-REFERENCE TO RELATED APPLICATION

This application claims the benefit of U.S. Provisional Patent Application No. 63/265,756, filed Dec. 20, 2021, which is incorporated by reference herein in its entirety.

BACKGROUND

The availability of labeled data is a pre-requisite for supervised learning tasks used to train a neural network model. The successful deployment of a machine learning system relies heavily on a robust labeled data set. As opposed to vision and natural language processing, automotive electromagnetic sensors lack sufficient high-quality labeled data, restricting the range of supervised learning tools available for electromagnetic sensor data processing.

SUMMARY

This document describes techniques and systems for fuzzy labeling of low-level electromagnetic sensor data. Sensor data in the form of an energy spectrum is obtained and the points within an estimated geographic boundary of a scatterer represented by the smear is labeled with a value of one. The remaining points of the energy spectrum are labeled with values between zero and one with the values decreasing the further away each respective remaining point is from the geographic boundary. The fuzzy labeling process may harness more in-depth information available from the distribution of the energy in the energy spectrum. A model can be trained to efficiently label an energy spectrum map in this manner. This may result in lower computational costs than other labeling methods. Additionally, false detections by the sensor may be reduced resulting in more accurate detection and tracking of objects.

This Summary introduces simplified concepts related to fuzzy labeling of low-level electromagnetic sensor data, further described in the Detailed Description and Drawings. This Summary is not intended to identify essential features of the claimed subject matter, nor is it intended for use in determining the scope of the claimed subject matter. Although primarily described in the context of automotive radar sensors, the techniques for fuzzy labeling of low-level electromagnetic sensor data can be applied to other applications where robust labeled data for training models related to electromagnetic sensors is desired. Further, these techniques may also be applied to other sensor systems providing an energy spectrum as low-level data.

BRIEF DESCRIPTION OF THE DRAWINGS

The details of one or more aspects of fuzzy labeling of low-level electromagnetic sensor data are described in this document with reference to the following figures, in which same numbers are used throughout to indicate like components.

DETAILED DESCRIPTION

Overview

Figure 1:
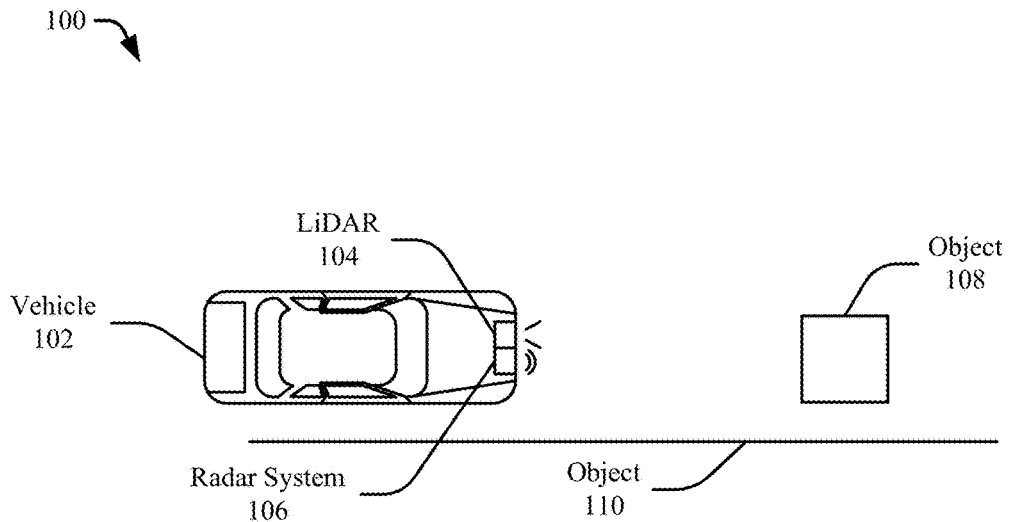
FIG. 1 illustrates an example training environment for fuzzy labeling of low-level electromagnetic sensor data, in accordance with techniques of this disclosure.
Figure 1:
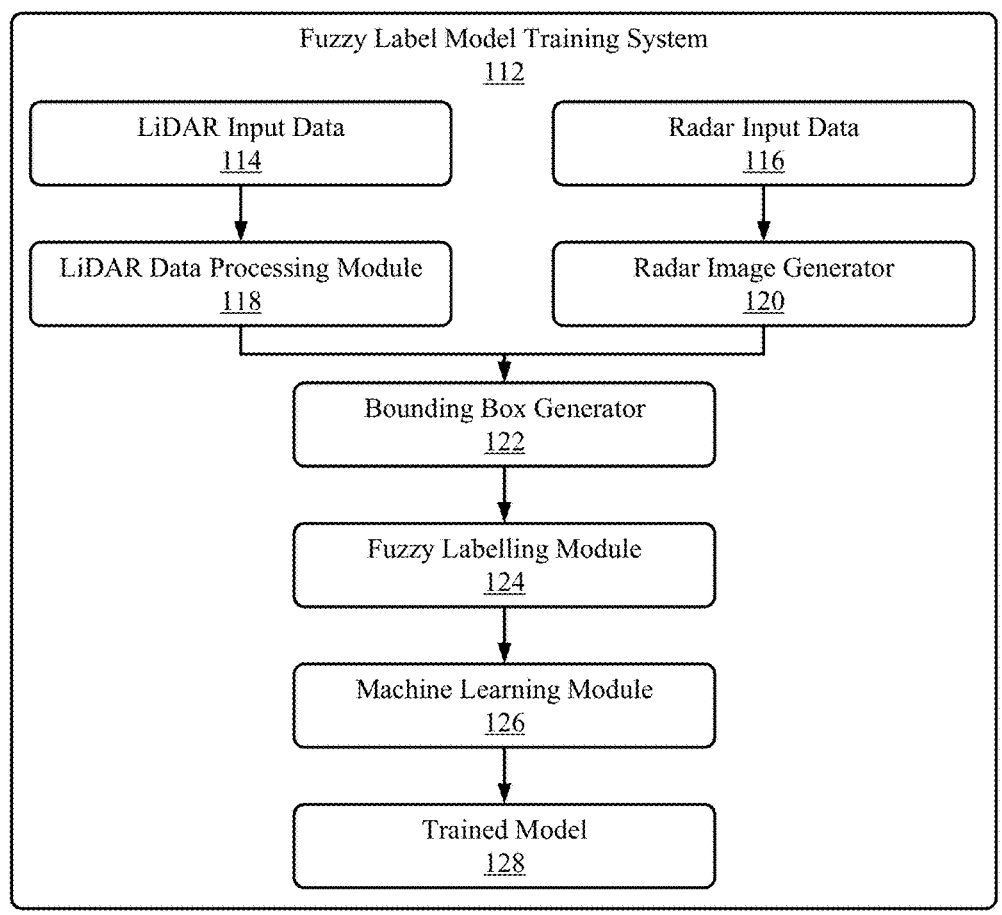

Labeling electromagnetic sensor (e.g., radar) data independently can be rare due to spectrum smearing (e.g., radar leakage in side angular bins) of targets in various dimensions (e.g., azimuth, elevation) and the difficulty of separating and segmenting objects. For example, a scatterer (e.g., object) of finite size produces a radar return that is a sine function. The energy distribution of this function along a particular dimension (e.g., azimuth angle), may show a peak at the location of the scatterer and sidelobes that diminish in intensity on either side of the peak. Thus, it can be challenging to segment an object or discern its boundaries in a radar return. In contrast, light detection and ranging (LiDAR) systems produce distinct three-dimensional point clouds, and cameras produce objects with clear boundaries in the two angular dimensions. The segmentation and labeling of objects are more accessible with LiDARs and cameras.

Some current approaches to labeling radar data may use the rigid labels produced by LiDARs or cameras that simultaneously collect data with the radar system. The object labels can be produced using the LiDAR or camera images and then be projected onto the radar data to define the rigid boundaries of the various labeled objects.

Some existing methods for labeling LiDAR and camera images segment the object using its geometric boundary and apply a binary label to a pixel in the image depending on whether the pixel lies within or outside of the boundary. Pixels inside the boundary may be labeled as 1 (positive) or 0 (negative). Due to radar spectrum smearing, the geometric boundary of the object is difficult, if not impossible, to determine from radar data alone. Further, if the geometric boundary derived from a LiDAR or camera image is projected onto radar data and binary labeling is applied, useful information in the extended radar reflection spectrum may be lost. Likewise, there is no geometric information in the range rate dimension, which is essential for detecting and classifying a moving object. If the radar data is labeled in a binary manner (positive and negative only), the neural network is trained to learn a rigid boundary, for example $$P(Y|X) = \begin{cases} p & Y \text{ is positive} \\ 1-p & Y \text{ is negative} \end{cases}$$

which is not easily discernible in radar data and more difficult to learn for a neural network.

In contrast, this document describes a fuzzy labeling system for radar data that segments and labels objects in the radar signal space (e.g., a radar spectrum map, radar image) on a pixel level. In this context, "fuzzy labeling" refers to a non-binary labeling method that assigns labels between 0 and 1 to pixels in the radar return (e.g., the radar spectrum smear) outside of the geometric boundary of the object as determined from LiDAR or camera data. Each pixel is not labeled as an independent data point. The properties and labels of the pixels are correlated spatially and temporally.

The fuzzy labeling system, as described herein, is based on radar signals (e.g., radar returns) and considers the soft boundary of objects seen in radar imagery. This fuzzy labeling process uses low-level radar data (e.g., time series, uncompressed data cube, lossless fast Fourier transform (FFT)) that harnesses in-depth information available from the distribution of the energy corresponding to the target across range, range rate, azimuthal, and elevation range. The fuzzy labeling system can localize the object in each of the four dimensions and can segment the energy distribution, containing useful information for detection, tracking, classification, and the like, corresponding to objects. This procedure may maximize the information extracted from the radar signal and can be used as inputs into a neural network that can be trained to detect and classify moving and stationary objects. In this manner, false positives may be reduced during object detection and tracking without degrading the system's dynamic range. Additionally, a model trained with the fuzzy labeling system, as described herein, may adapt to different driving scenarios, including scenarios not included in the training, while maintaining performance of the trained model. Although the fuzzy labeling system is described in context of vehicle radar sensors, the fuzzy labeling system may be used with other electromagnetic sensors in other applications.

Example Environment

FIG. 1 illustrates an example training environment 100 for fuzzy labeling of low-level electromagnetic sensor data, in accordance with techniques of this disclosure. In this example, a first sensor on a vehicle 102 is described as a LiDAR sensor 104, and a second sensor on the vehicle 102 is described as a radar sensor 106. However, the first sensor can be any imaging sensor such as an optical camera or a thermal camera. Likewise, the second sensor can be any electromagnetic sensor or other sensor that includes spectrum spreading due to energy leakage in its data (e.g., sonar).

The example training environment 100 can be a controlled environment that the vehicle 102 including the LiDAR sensor 104 and the radar sensor 106 uses to collect sensor data about the training environment 100. The training environment 100 includes one or more objects such as object 108 and object 110.

The LiDAR sensor 104 collects LiDAR data that includes geometric locations of the objects 108 and 110. The geometric locations may include specific geometric boundaries of the objects 108 and 110 such as can be determined in the LiDAR point cloud. The radar sensor 106 collects low-level radar data that may have higher resolution in some dimensions (e.g., range, Doppler) and lower resolution in other dimensions (e.g., azimuth, elevation). This lower resolution can be represented as an energy spectrum smear when the radar data is represented as an energy spectrum map. The energy spectrum map can be two dimensional representing dimensions such as range and time or elevation and time.

A fuzzy labeling model training system 112 can obtain the LiDAR data and the low-level radar data by over-the-air (OTA) means or by other methods from the vehicle 102. In other aspects, the fuzzy labeling model training system 112 may reside in the vehicle 102. The LiDAR data can be input into the fuzzy labeling model training system 112 as LiDAR input data 114. The LiDAR input data 114 serves as the ground truth for training a model. Likewise, the radar data can be input into the fuzzy labeling model training system 112 as radar input data 116. The fuzzy labeling model training system 112 can include a combination of hardware components and software components executing thereon. For example, a non-transitory computer-readable storage media (CRM) of the fuzzy labeling model training system 112 may store machine-executable instructions that, when executed by a processor of the fuzzy labeling model training system 112, cause the fuzzy labeling model training system 112 to output a trained model 128 based on fuzzy labeling of low-level electromagnetic sensor data. The fuzzy labeling model training system 112 also includes a LiDAR data processing module 118, a radar image generator 120, a bounding box generator 122, a fuzzy labeling module 124, and a machine learning module 126. In other examples, the operations associated with the fuzzy labeling model training system 112 can be performed using a different arrangement or quantity of components than that shown in FIG. 1.

The LiDAR data processing module 118 can identify the geographic locations, and specifically, the geographic boundaries of objects 108 and 110. The LiDAR data processing module can output this geographic boundary information to the bounding box generator 122.

The radar image generator 120 can generate an energy spectrum map based on the radar input data 116. The energy spectrum map may be, for example, a range-time map generated by selecting certain azimuth and Doppler bins and collapsing the elevation dimension. This can generate the amplitude of various ranges in time to make the range-time map. Similarly, other dimensions may be represented in an energy spectrum map. The energy spectrum map may also be referred to as a radar image since it can be analyzed and manipulated like a camera image. The spectrum smear (e.g., radar spectrum smear) may be observed on the radar image as high intensity pixels (e.g., bright pixels) surrounded by pixels that lose their intensity as they spread away from the high intensity pixels. The spectrum smear can be caused by radar leakage in side angular bins and may contribute to the noise levels of the radar sensor 106. The energy spectrum map may be represented as a radar image, similar to a camera image, having pixels that can be analyzed based on various characteristics (e.g., location within the image, intensity). The radar image generated by the radar image generator 120 can be output to the bounding box generator 122.

The bounding box generator 122 can receive the geographic boundaries of objects 108 and 110 and generate a first bounding box based on the geographic boundaries of the objects 108 and 110. Likewise, the bounding box generator 122 can determine radar smears that may be associated with the objects 108 and 110 and generate a second bounding box that encompasses the associated radar smears. The bounding box generator 122 can project the first bounding box and the second bounding box onto the radar image. Based on the projection of the first bounding box and the second bounding box onto the radar image, a first portion of the radar smear can be identified. The first portion is the union of the first bounding box and the second bounding box. A second portion of the radar smear encompasses the remainder of the radar smear not included in the first portion.

The fuzzy labeling module 124 can label the first portion of the radar smear with a highest value (e.g., a value of one on a scale from zero to one). The fuzzy labeling module 124 can analyze the second portion of the radar smear and label the pixels in the second portion with a value between a lowest value and the highest value. The pattern of labeling of the pixels in the second portion may generally be from higher values to lower values depending upon their distance from the first portion. For example, the pixels in the second portion may be labeled, from closest to the first portion to the farthest from the first portion as a pattern such as 0.9, 0.8, 0.75, 0.5, 0.4, 0.2, 0.1. The decreasing pattern may be linear, exponential, Gaussian, or any other continuous function. Any pixels in the radar image not associated with the first portion or second portion of the radar smear can be labeled a lowest value (e.g., zero).

The labels generated by the fuzzy labeling module 124 can be used as labels for the machine learning module 126. Because the fuzzy labels are based on an image (e.g., the radar image) neural networks that are conducive to processing images may be used by the machine learning module. One such example of a neural network that may be used is a convolutional neural network (CNN), although others may be used. The machine learning module 126 outputs the trained model 128, which can then be deployed to automotive systems. Because the trained model 128 has been trained in a controlled environment using machine learning techniques, it can be very efficient in terms of computations and memory. This efficiency enables the trained model 128 to be used in automotive applications that have limited computing resources. Further, the trained model 128 may result in less false positives detected by a radar system when used in an uncontrolled environment.

In some aspects, the fuzzy labeling model training system 112 may reside in the vehicle 102, and the trained model 128 may be constantly retrained with sensor data received by the vehicle 102 in uncontrolled environments. Further, the retrained model may be deployed to other vehicles. Other vehicles may also include other fuzzy labeling model training system 112. Each respective vehicle may upload their respective retrained model and/or their respective sensor data to a cloud. In these aspects, the trained model 128 may be retrained with very large data sets.

Figure 2:
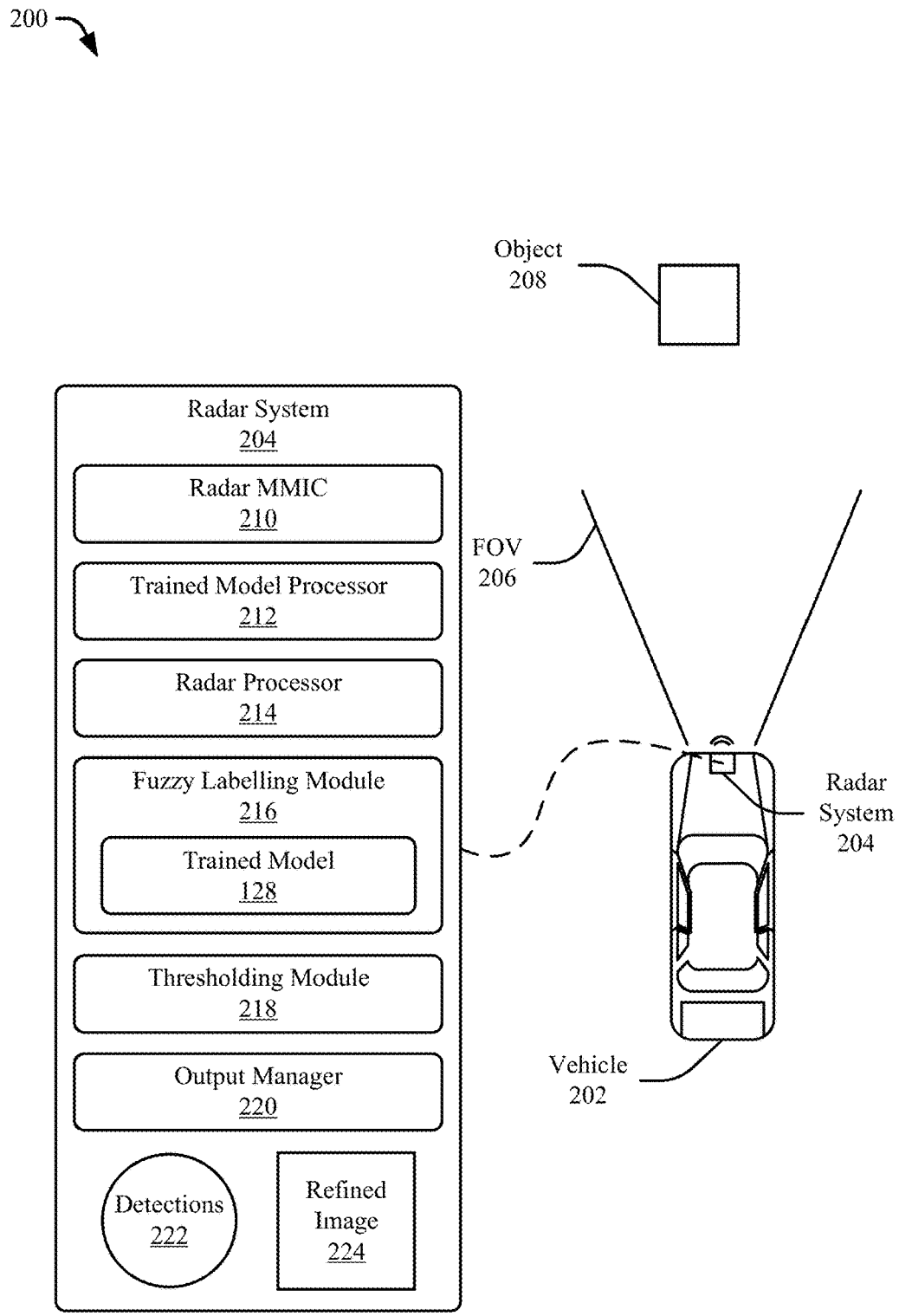
FIG. 2 illustrates an example environment in which fuzzy labeling of low-level electromagnetic sensor data can be applied, in accordance with techniques of this disclosure.

FIG. 2 illustrates an example environment 200 in which fuzzy labeling of low-level electromagnetic sensor data can be applied, in accordance with techniques of this disclosure. In the depicted environment 200, a vehicle 202 travels on a roadway by at least partially relying on output from a radar system 204. Although illustrated as a passenger car, the vehicle 202 can represent other types of motorized vehicles (e.g., truck, motorcycle, bus, tractor, semi-trailer truck), non-motorized vehicles (e.g., a bicycle), railed vehicles (e.g., a train), watercraft (e.g., a boat), aircraft (e.g., an airplane), spacecraft (e.g., satellite), and the like.

The radar system 204 can be installed on, mounted to, or integrated with any moving platform, including moving machinery or robotic equipment. Components of the radar system 204 can be arranged in a front, back, top, bottom, or side portion of the vehicle 202, within a bumper, integrated into a side mirror, formed as part of a headlight and/or taillight, or at any other interior or exterior location where objects require detection. The vehicle 202 may include multiple radar systems 204, such as a first radar system and a second radar system, to provide a custom field-of-view 206 that encompasses a particular region of interest outside the vehicle 202. Acting as part of a perception system of the vehicle 202, the radar system 204 aids in driving the vehicle 202 by enabling advanced safety or autonomous driving features. Vehicle subsystems may rely on the radar system 204 to detect whether any objects (e.g., an object 208) appear in the environment 200 within a particular field of view (FOV) 206.

The radar system 204 is configured to detect the object 208 by radiating the object 208 within the field of view 206. For example, the object 208 can be a stationary or moving object and includes one or more materials that reflect radar signals. The object 208 may be another vehicle, a traffic sign, a barrier, an animal, a pedestrian, or any other object or debris.

The radar system 204 can include a combination of hardware components and software components executing thereon. For example, a non-transitory computer-readable storage media (CRM) of the radar system 204 may store machine-executable instructions that, when executed by a processor of the radar system 204, cause the radar system 204 to output information about objects detected in the field of view 206. As one example, the radar system 204 includes a signal processing component that may include a radar monolithic microwave integrated circuit (MMIC) 210, a trained model processor 212, and a radar processor 214. The radar MMIC 210, the trained model processor 212, and the radar processor 214 may be physically separated components, or their functionality may be included within a single integrated circuit. Other processors may, likewise, be present in some aspects. In this example, the radar system 204 also includes a fuzzy labeling module, a thresholding module 218, and an output manager 220. In other examples, the operations associated with the radar system 204 can be performed using a different arrangement or quantity of components than that shown in FIG. 2. These components receive radar signals to generate detections 222 and a refined radar image 224 (e.g., a radar image with reduce false positives). The detections 222 and the refined radar image 224 can be used to update object tracks and classify objects.

For example, the radar MMIC 210 may receive low-level radar signals from the radar system 204 that were transmitted by the radar system 204 and reflected from the object 208. These low-level radar signals may be digitized raw signals, or signals that have been pre-processed (e.g., lossless FFT, uncompressed data cube) without loss of data. The low-level radar signals can be input into the fuzzy labeling module 216 being executed by the trained model processor 212. A low-level radar image based on the low-level radar data can be generated, and the pixels of the low-level radar image can be labeled based on the trained model 128. The labeled data (e.g., labeled pixels) can be output to the thresholding module 218 being executed on the radar processor 214. The thresholding module 218 applies a threshold value to the labeled data and generates the refined radar image 224 that includes only the labeled data that is greater than the threshold value. The detections 222 can, likewise, be determined from the labeled data that is greater than the threshold value. The output manager 220 can output the detections 222 and the refined radar image 224 to other systems of the vehicle 202 for automotive and safety applications. In this manner, he outputted detections 222 and the refined radar image 224 may include relevant information included in the low-level radar data but lower the quantity of false detections that the radar system 204 may have reported without using the trained model 128.

Example Vehicle Configuration

Figure 3:
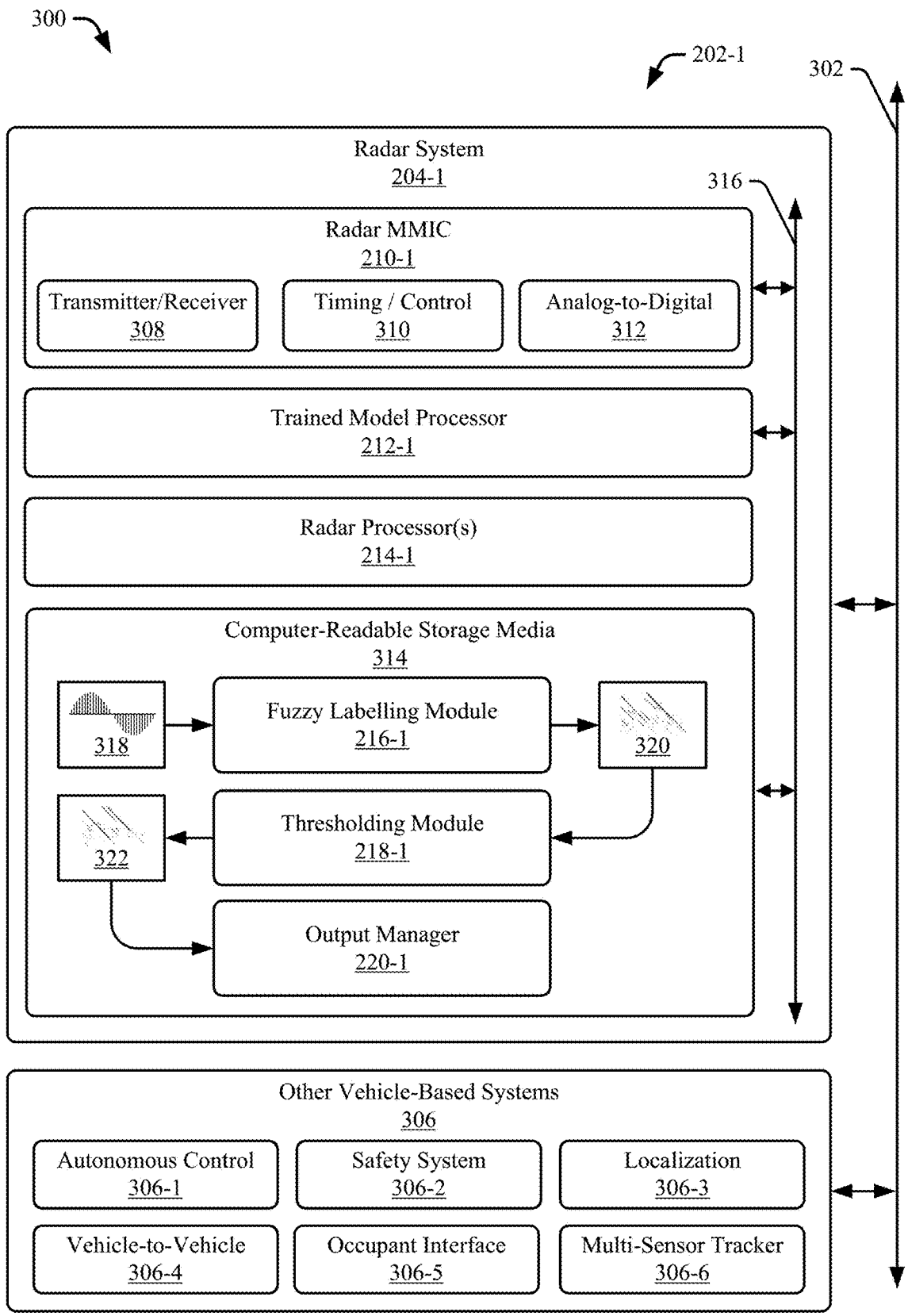
FIG. 3 illustrates an example vehicle including a system configured to utilize a model trained using fuzzy labeling of low-level electromagnetic sensor data, in accordance with techniques of this disclosure.

FIG. 3 illustrates an example vehicle 202-1 including a system configured to utilize a model trained using fuzzy labeling of low-level electromagnetic sensor data, in accordance with techniques of this disclosure. The vehicle 202-1 is an example of the vehicle 202. Included in the vehicle 202-1 is a radar system 204-1, which is an example of the radar system 204. The vehicle 202-1 further includes a communication link 302 that the radar system 204-1 can use to communicate to other vehicle-based systems 306. The communication link 302 may be a wired or wireless link and, in some cases, includes a communication bus (e.g., CAN bus). The other vehicle-based systems 306 perform operations based on information received from the radar system 204-1, over the link 302, such as data output from the radar system 204-1, including information indicative of one or more objects identified and tracked in the FOV.

The radar system 204-1 includes a radar MMIC 210-1, a trained model processor (e.g., embedded processor for machine learned models) 212-1, and a radar processor 214-1, similar to the radar system 204. The radar MMIC 210-1 includes one or more transceivers/receivers 308, timing/control circuitry 310 and analog-to-digital converters (ADC) 312.

The radar system 204-1 further includes a non-transitory computer-readable storage media (CRM) 314 (e.g., a memory, long-term storage, short-term storage), which stores instructions for the radar system 204-1. The CRM 314 stores a fuzzy labeling module 216-1, a thresholding module 218-1, and an output manager 220-1. Other instructions, relevant to the operation of the radar system 204-1 may, likewise, be stored in the CRM 314. The components of the radar system 204-1 communicate via a link 316. For example, the trained model processor 212-1 receives low-level radar data 318 from the MMIC 210-1 over the link 316 and instructions from the CRM 314 to execute the fuzzy labeling module 216-1. The radar processor 214-1 receives labeled radar images 320 (e.g., fuzzy labeled radar images) from the trained model processor 212-1. The radar processor 214-1 also receives instructions from the CRM 314 to execute the thresholding module 218-1 and the output manager 220-1 over the link 316.

The fuzzy labeling module 216-1 generates a low-level radar image based on the low-level radar data 318 and executes a model (e.g., the trained model 128) trained to perform fuzzy labeling of low-level electromagnetic sensor data. The trained model labels the pixels of the low-level radar image from zero to one based on the training techniques described herein. The output of the fuzzy labeling module 216-1 is the labeled radar image 320. The trained model may be periodically updated via over-the-air (OTA) updates or by other methods.

The thresholding module 218-1 receives the labeled radar image 320 and applies a thresholding value to the labeled pixels. The thresholding module 218-1 outputs the refined radar image 322. The refined radar image 322 includes the pixels of the labeled radar image that are greater than the threshold value. The refined radar image 322 is made available by the output manager 220-1 to the other vehicle-based systems 306. Detections based on the refined radar image 322 may also be made available to the other vehicle-based systems 306.

The other vehicle-based systems 306 can include autonomous control system 306-1, safety system 306-2, localization system 306-3, vehicle-to-vehicle system 306-4, occupant interface system 306-5, multi-sensor tracker 306-6, and other systems not illustrated. Objects in the FOV can be inferred and classified based on the refined radar image 322 output to the other vehicle-based systems 306. In this manner, the other vehicle-based systems 306 can receive an indication of one or more objects detected by the radar system 204-1 in response to the radar system 204-1 combining and analyzing the radar data generated by the received signals. The other vehicle-based systems 306 may perform a driving function or other operation that may include using output from the radar system 204-1 to assist in determining driving decisions. For example, the autonomous control system 306-1 can provide automatic cruise control and monitor the radar system 204-1 for output that indicates the presence of objects in the FOV, for instance, to slow the speed and prevent a collision with an object in the path of the vehicle 202-1. The safety system 306-2 or the occupant interface system 306-5 may provide alerts or perform a specific maneuver when the data obtained from the radar system 204-1 indicates that one or more objects are crossing in front of the vehicle 202-1.

Example Implementations

Figure 4:
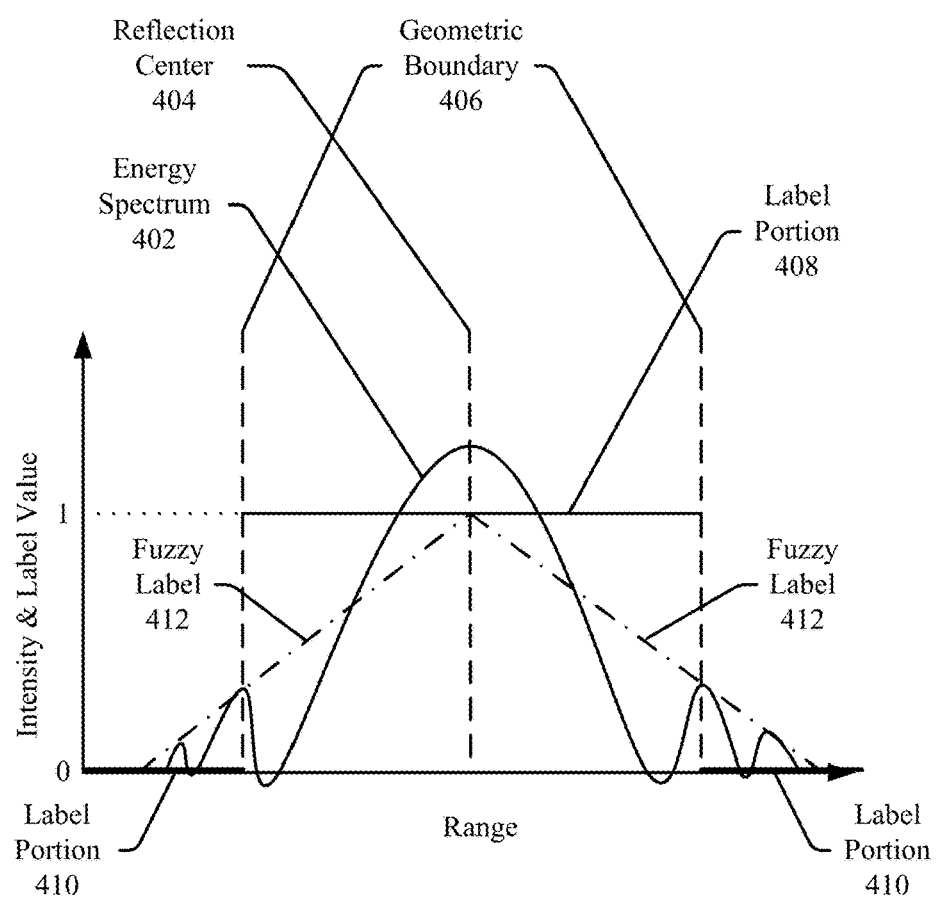
FIG. 4 illustrates a graph of an energy spectrum being labeled using fuzzy labeling of low-level electromagnetic sensor data, in accordance with techniques of this disclosure.

FIG. 4 illustrates a graph 400 of an energy spectrum 402 being labeled using fuzzy labeling of low-level electromagnetic sensor data, in accordance with techniques of this disclosure. The graph 400 demonstrates fuzzy labeling logic in the range dimension with a linear decreasing pattern. However, any radar dimension may be demonstrated.

The energy spectrum 402 may be a typical energy spectrum of finite extent from a scatterer (e.g., object). The reflection center 404 of the energy spectrum 402 represents an intensity peak of the energy spectrum 402. The geometric boundary 406 of the scatterer may not be discernible in the energy spectrum 402 and may be determined from data from another sensor projected onto the energy spectrum 402 (e.g., LiDAR data projected onto a radar image).

Some traditional labeling techniques may label the energy spectrum 402 using binary labeling. For example, after estimating the geometric boundary 406 of the scatterer on the energy spectrum 402, the label portion 408 representing the geometric boundary 406 and the area within the geometric boundary may be labeled with a one. The label portions 410 of the energy spectrum 402 that lies outside the geometric boundary 406 may have no label (e.g., label with a value of zero).

In contrast, using fuzzy labeling logic, the reflection center 404 of the energy spectrum 402 can be labeled with a one. The fuzzy labels 412 descend from one to zero. Instead of labeling only the geometric boundary 406, fuzzy labeling labels the entire energy spectrum 402 and accounts for the soft boundary of the scatterer included in the energy spectrum 402. Using fuzzy labeling logic in this manner enables all the information in a radar signal to be considered. Fuzzy labeling logic may provide a machine-learned model (e.g., artificial neural network) with less ambiguous labeling and result in a more robust model for radar sensors, traffic scenarios, and types of objects (e.g., targets). Additionally, Fuzzy labeling may produce fewer false positives than traditional labeling techniques.

Figure 5:
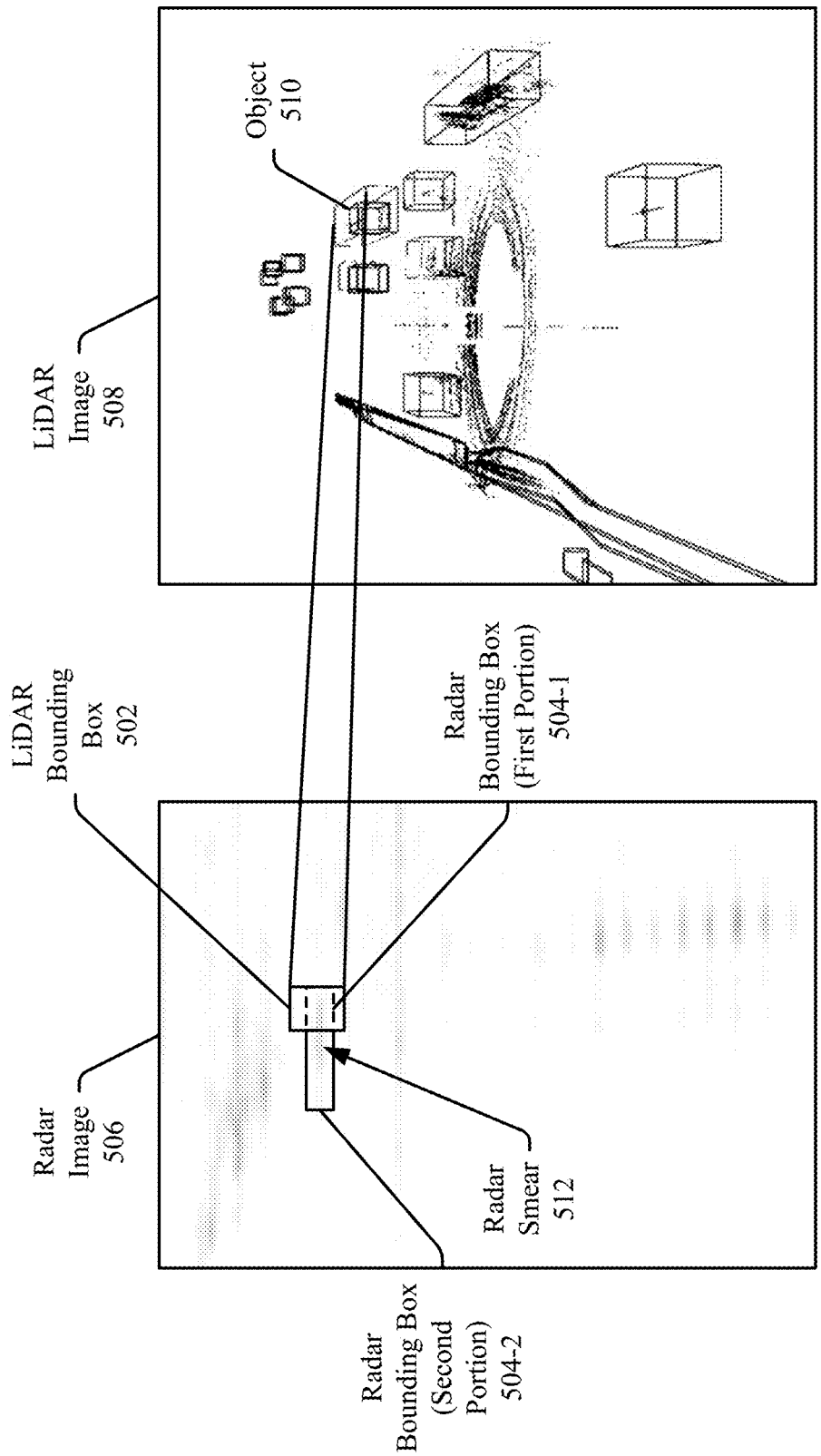
FIG. 5 illustrates a LiDAR bounding box and a radar bounding box projected onto a radar image for fuzzy labeling of low-level electromagnetic sensor data, in accordance with techniques of this disclosure.

FIG. 5 illustrates a LiDAR bounding box 502 and a radar bounding box 504 projected onto a radar image 506 for fuzzy labeling of low-level electromagnetic sensor data, in accordance with techniques of this disclosure. The radar image exhibits areas of radiation reflected by objects and received by a radar sensor.

LiDAR point cloud 508 detects several objects including object 510. The LiDAR bounding box 502 of the object 510 is projected on to the radar image 506 and represents the geometric location (e.g., geometric boundary) of the object 510 on a radar smear 512 on the radar image 506.

The radar bounding box 504 encompasses the radar smear 512. The radar bounding box 504 includes a first portion 504-1 and a second portion 504-2 of the radar smear 512. The first portion 504-1 corresponds to the portion of the radar smear that is the geometric location of the object 510.

The first portion 504-1 is determined by finding the union of the LiDAR bounding box 502 and the radar bounding box 504. The second portion 504-2 includes the remainder of the radar smear outside of the geometric location of the object 510. For fuzzy labeling of the radar smear 512, the pixels in the first portion 504-1 can be labeled with a value of one. The pixels in the second portion 504-2 can be labeled with values between zero and one with the values being higher for the pixels closer to the first portion 504-1 and descending the further away each respective pixel is from the first portion 504-1. This fuzzy labeling system enables continuous, smooth labeling of all the pixels in the radar smear 512 and considers all the information contained in the radar smear 512.

Example Methods

Figure 6:
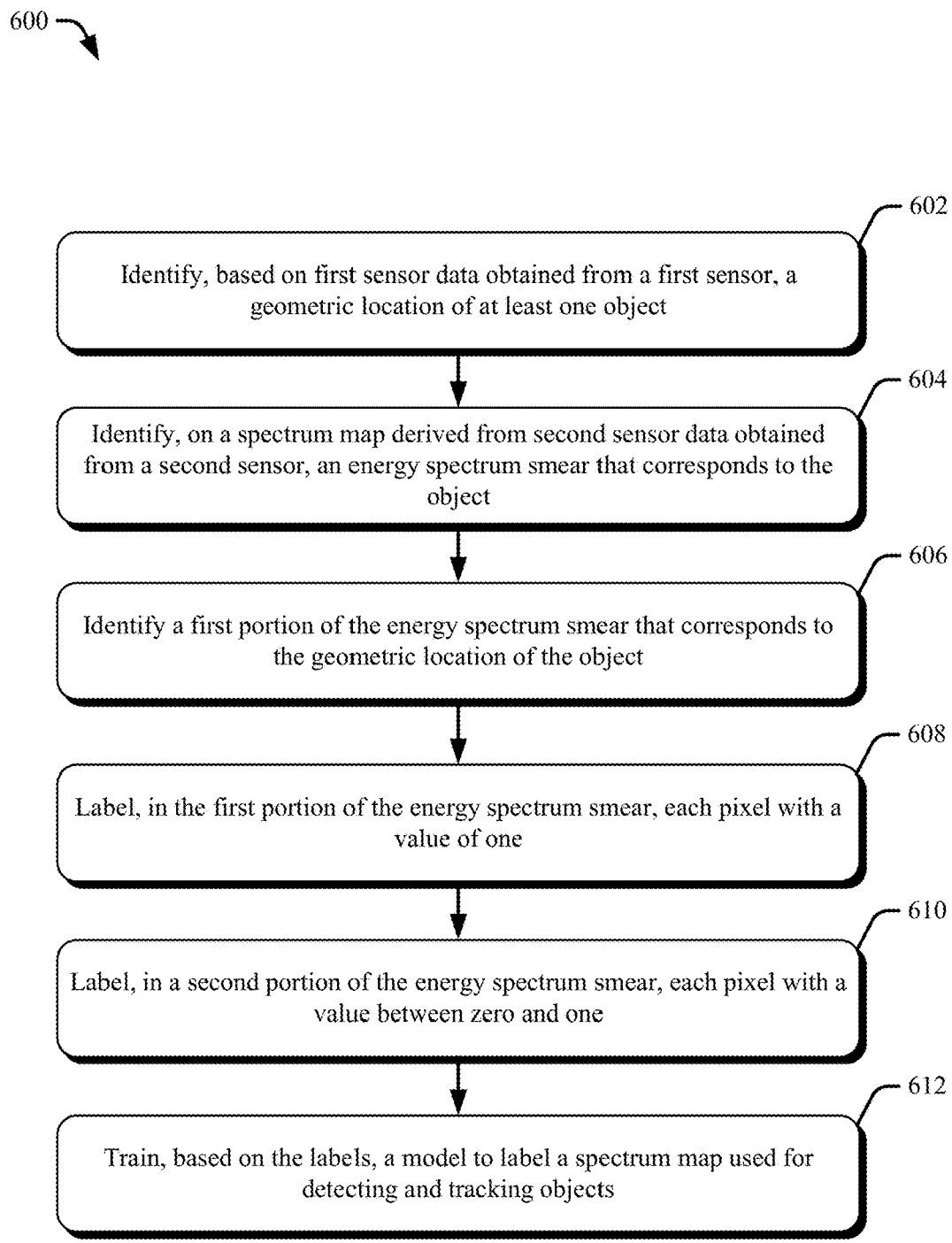
FIG. 6 illustrates an example method for fuzzy labeling of low-level electromagnetic sensor data, in accordance with techniques of this disclosure.

FIG. 6 illustrates an example method 600 for fuzzy labeling of low-level electromagnetic sensor data, in accordance with techniques of this disclosure. The fuzzy labels are used to train a machine-learned model to label electromagnetic images efficiently using little computational resources. The data can be collected in a controlled training environment where the objects are specifically placed in certain geometric locations. At step 602, a geometric location (e.g., geometric boundary) of an object is identified based on first sensor data obtained from a first sensor. The first sensor may be any imaging sensor, such as a LiDAR or a camera, that can provide distinct outlines of objects in its field of view.

At step 604, an energy spectrum smear on a spectrum map derived from second sensor data is identified that corresponds to the object. The spectrum map (e.g., radar image) can be derived from low-level data obtained from an electromagnetic sensor such as a radar sensor. The spectrum map can be a two-dimensional map that represents dimensions of the electromagnetic sensor such as the range and time dimensions. The energy spectrum smear, or radar smear, may represent the object and energy leakage (e.g., noise) in side angular bins (e.g., data derived from side lobes of the second sensor antenna) of the second sensor data. By collapsing the elevation information in the second sensor data, the spectrum map may include the range and time dimensions.

At step 606, a first portion of the energy spectrum smear is identified. The first portion corresponds to the geometric location of the object. The first portion may be identified by projecting the geometric location identified in the first sensor data onto the spectrum map. Specifically, a bounding box may be generated around the geometric location in the first sensor data image and projected onto the spectrum map to identify the first portion of the energy spectrum smear.

At step 608, each pixel in the first portion of the energy spectrum smear is labeled with a value of one. Because this first portion encompasses the geometric boundary of the object, these labels can be used as ground truth for training the model.

At step 610, each pixel in a second portion of the energy spectrum smear is labeled with a value between zero and one. The second portion includes all the pixels in the energy spectrum smear not included in the first portion. That is, the first portion and the second portion include all the pixels in the energy spectrum smear. The pixels in the second portion that are closer to the first portion are labeled with higher values. The values of the pixels decrease as the location of each respective pixel is further away from the first portion. For example, a pixel in the second portion that is close to the first portion may have a value of 0.9. The next closest pixel may have a value of 0.8, and so forth. The decreasing pattern of values of pixels may be linear, exponential, Gaussian, or any other continuous function. In some cases, the energy spectrum smear may correspond to a plurality of objects. The objects may be indistinguishable in the energy spectrum smear in these cases. However, the labeling of the pixels is the same as when the energy spectrum smear corresponds to only a single object.

At step 612, a model is trained, based on the labels of the first portion and the second portion of the energy spectrum smear, to label pixels in a spectrum map used in a real world application. Because the spectrum map is essentially an image, machine learning techniques used to train image classification models can be used. For example, the model can be a convolutional neural network that is effective at classifying pixels in images. Further, extensive computing resources can be used to train the model because the training can take place outside of an automotive system (e.g., in a lab). The resulting model executable software may be very inexpensive in terms of computing resources and, thus, ideal for automotive applications. Using this method to train a model using fuzzy labeling may consider all the data that is in a received electromagnetic signal. The output of the trained model may be used to accurately detect objects while minimizing false detections.

ADDITIONAL EXAMPLES

Example 1: A method comprising: identifying, based on first sensor data obtained from a first sensor, a geometric location of at least one object; identifying, on a spectrum map derived from second sensor data obtained from a second sensor, an energy spectrum smear that corresponds to the object, the second sensor being an electromagnetic sensor; identifying a first portion of the energy spectrum smear that corresponds to the geometric location of the object; labeling, in the first portion of the energy spectrum smear, each pixel with a value of one; labeling, in a second portion of the energy spectrum smear that includes all pixels of the energy spectrum smear not included in the first portion, each pixel with a value between zero and one, the value decreasing the further each respective pixel is from the first portion of the energy spectrum smear; and training, by machine learning and based on the labeling of each pixel in the first portion and each pixel in the second portion, a model to label a spectrum map used for detecting and tracking objects.

Example 2: The method of example 1, further comprising labeling each pixel in the spectrum map that is not included in the energy spectrum smear with a value of zero.

Example 3: The method of any one of the preceding examples, wherein the model is a convolutional neural network.

Example 4: The method of any one of the preceding examples, wherein the first sensor is one of a light detection and ranging (LiDAR) sensor or a camera.

Example 5: The method of any one of the preceding examples, wherein the second sensor is a radar sensor.

Example 6: The method of any one of the preceding examples, wherein the energy spectrum smear comprises radar energy leakage in side angular bins.

Example 7: The method of any one of the preceding examples, wherein deriving the spectrum map comprises generating a radar image by selecting azimuth and Doppler bins.

Example 8: The method of any one of the preceding examples, wherein generating the radar image further comprises collapsing elevation information in the second sensor data such that the radar image includes range and time dimensions.

Example 9: The method of any one of the preceding examples, wherein identifying the geometric location of the object comprises determining a first bounding box that represents a geometric boundary of the object.

Example 10: The method of any one of the preceding examples, wherein identifying the first portion of the energy spectrum smear comprises projecting the first bounding box onto the spectrum map.

Example 11: The method of any one of the preceding examples, wherein identifying the energy spectrum smear comprises determining a second bounding box that includes the first portion of the energy spectrum smear and the second portion of the energy spectrum smear.

Example 12: The method of any one of the preceding examples, wherein the second portion of the energy spectrum smear is a portion of the energy spectrum smear included in the second bounding box but not included in the first bounding box.

Example 13: The method of any one of the preceding examples, wherein the geometric boundary of the object is used as ground truth data for training the trained model that labels each pixel of the spectrum map.

Example 14: The method of any one of the preceding examples, wherein the energy spectrum smear corresponds to a plurality of objects near to one another such that each respective object of the plurality of objects is indistinguishable from the other objects in the energy spectrum smear.

Example 15: A system comprising: at least one processor configured to: obtain first sensor data from a first sensor, the first sensor data based on a controlled environment including at least one object; obtain second sensor data from a second sensor, the second sensor data based on the controlled environment, the second sensor being an electromagnetic sensor; identify, based on the first sensor data, a geometric location of the object; generate, based on the second sensor data, a spectrum map exhibiting an area of radiation reflected by objects in the controlled environment; identify, on the spectrum map, an energy spectrum smear that corresponds to radiation reflected by the object; identify a first portion of the energy spectrum smear that corresponds to the geometric location of the object; label, in the first portion of the energy spectrum smear, each pixel with a value of one; label, in a second portion of the energy spectrum smear that includes all pixels of the energy spectrum smear not included in the first portion, each pixel with a value between zero and one, the value decreasing the further each respective pixel is from the first portion of the energy spectrum smear; and train, by machine learning and based on the labeling of each pixel in the first portion and each pixel in the second portion, a model to label a spectrum map used for detecting and tracking objects.

Example 16: The system of any one of the preceding examples, wherein: the first sensor is one of a light detection and ranging (LiDAR) sensor or a camera; and the second sensor is a radar sensor.

Example 17: The system of any one of the preceding examples, wherein the processor is configured to generate the spectrum map by at least: generating a radar image by selecting azimuth and Doppler bins; and collapsing elevation information in the second sensor data such that the radar image includes range and time dimensions.

Example 18: The system of any one of the preceding examples, wherein the energy spectrum smear comprises radar energy leakage in side angular bins determined in the second sensor data.

Example 19: The system of any one of the preceding examples, wherein the processor is further configured to: identify the geometric location of the object by at least determining a first bounding box that represents a geometric boundary of the object; identify the energy spectrum smear by at least determining a second bounding box that includes all the pixels of the energy spectrum smear on the spectrum map; and identify the first portion of the energy spectrum smear by at least projecting the first bounding box on the spectrum map, the first portion being a union of the first bounding box and the second bounding box.

Example 20: A system comprising: at least one processor configured to: receive, based on an uncontrolled environment, sensor data from an electromagnetic sensor related to at least one object; generate, based on the sensor data, a spectrum map exhibiting an area of radiation reflected by the object; generate, by a trained model, a labeled sensor data image based on the spectrum map, the trained model trained to label the sensor data image by at least: identifying, on the spectrum map, an energy spectrum smear that corresponds to radiation reflected by the object; identifying a first portion of the energy spectrum smear that corresponds to a geometric location of the object; labeling, in the first portion of the energy spectrum smear, each pixel with a value of one; and labeling, in a second portion of the energy spectrum smear that includes all pixels of the energy spectrum smear not included in the first portion, each pixel with a value between zero and one, the value decreasing the further each respective pixel is from the first portion of the energy spectrum smear; and output the labeled sensor data image for detecting and tracking objects using the electromagnetic sensor.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with labeling sensor data can occur in other systems. Therefore, although described as a way to fuzzy label low-level electromagnetic sensor data, the techniques of the foregoing description can be applied to other systems that would benefit from fuzzy labeling. Further, these techniques may also be applied to other sensors that output energy spectrums.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
   identifying, based on first sensor data obtained from a first sensor, a geometric location of at least one object;

identifying, on a spectrum map derived from second sensor data obtained from a second sensor, an energy spectrum smear that corresponds to the object, the second sensor being an electromagnetic sensor;

identifying a first portion of the energy spectrum smear that corresponds to the geometric location of the object;

labeling, in the first portion of the energy spectrum smear, each pixel with a value of one;

labeling, in a second portion of the energy spectrum smear that includes all pixels of the energy spectrum smear not included in the first portion, each pixel with a value between zero and one, the value decreasing the further each respective pixel is from the first portion of the energy spectrum smear; and training, by machine learning and based on the labeling of each pixel in the first portion and each pixel in the second portion, a model to label spectrum maps used for detecting and tracking objects.

2. The method of claim 1, further comprising labeling each pixel in the spectrum map that is not included in the energy spectrum smear with a value of zero.

3. The method of claim 2, wherein the model is a convolutional neural network.

4. The method of claim 1, wherein:
the first sensor is one of a light detection and ranging (LiDAR) sensor or a camera; and
the second sensor is a radar sensor.

5. The method of claim 4, wherein the energy spectrum smear comprises radar energy leakage in side angular bins.

6. The method of claim 4, wherein deriving the spectrum map comprises generating a radar image by selecting azimuth and Doppler bins.

7. The method of claim 6, wherein generating the radar image further comprises collapsing elevation information in the second sensor data such that the radar image includes range and time dimensions.

8. The method of claim 1, wherein identifying the geometric location of the object comprises determining a first bounding box that represents a geometric boundary of the object.

9. The method of claim 8, wherein identifying the first portion of the energy spectrum smear comprises projecting the first bounding box onto the spectrum map.

10. The method of claim 9, wherein identifying the energy spectrum smear comprises determining a second bounding box that includes the first portion of the energy spectrum smear and the second portion of the energy spectrum smear.

11. The method of claim 10, wherein the second portion of the energy spectrum smear is a portion of the energy spectrum smear included in the second bounding box but not included in the first bounding box.

12. The method of claim 8, wherein the geometric boundary of the object is used as ground truth data for training the trained model that labels each pixel of the spectrum map.

13. The method of claim 1, wherein the energy spectrum smear corresponds to a plurality of objects near to one another such that each respective object of the plurality of objects is indistinguishable from the other objects in the energy spectrum smear.

14. A system comprising:
at least one processor configured to:
obtain first sensor data from a first sensor, the first sensor data based on a controlled environment including at least one object;

obtain second sensor data from a second sensor, the second sensor data based on the controlled environment, the second sensor being an electromagnetic sensor;

identify, based on the first sensor data, a geometric location of the object;

generate, based on the second sensor data, a spectrum map exhibiting an area of radiation reflected by objects in the controlled environment;

identify, on the spectrum map, an energy spectrum smear that corresponds to radiation reflected by the object;

identify a first portion of the energy spectrum smear that corresponds to the geometric location of the object;

label, in the first portion of the energy spectrum smear, each pixel with a value of one;

label, in a second portion of the energy spectrum smear that includes all pixels of the energy spectrum smear not included in the first portion, each pixel with a value between zero and one, the value decreasing the further each respective pixel is from the first portion of the energy spectrum smear; and train, by machine learning and based on the labeling of each pixel in the first portion and each pixel in the second portion, a model to label a spectrum map used for detecting and tracking objects.

15. The system of claim 14, wherein the model is a convolutional neural network.

16. The system of claim 14, wherein:
the first sensor is one of a light detection and ranging (LiDAR) sensor or a camera; and
the second sensor is a radar sensor.

17. The system of claim 15, wherein the processor is configured to generate the spectrum map by at least:
generating a radar image by selecting azimuth and Doppler bins; and
collapsing elevation information in the second sensor data such that the radar image includes range and time dimensions.

18. The system of claim 15, wherein the energy spectrum smear comprises radar energy leakage in side angular bins determined in the second sensor data.

19. The system of claim 15, wherein the processor is further configured to:
identify the geometric location of the object by at least determining a first bounding box that represents a geometric boundary of the object;
identify the energy spectrum smear by at least determining a second bounding box that includes all the pixels of the energy spectrum smear on the spectrum map; and
identify the first portion of the energy spectrum smear by at least projecting the first bounding box on the spectrum map, the first portion being a union of the first bounding box and the second bounding box.

20. A system comprising:
at least one processor configured to:
receive, based on an uncontrolled environment, sensor data from an electromagnetic sensor related to at least one object;
generate, based on the sensor data, a spectrum map exhibiting an area of radiation reflected by the object;
generate, by a trained model, a labeled sensor data image based on the spectrum map, the trained model trained to label the sensor data image by at least:

identifying, on the spectrum map, an energy spectrum smear that corresponds to radiation reflected by the object;

identifying a first portion of the energy spectrum smear that corresponds to a geometric location of the object;

labeling, in the first portion of the energy spectrum smear, each pixel with a value of one; and labeling, in a second portion of the energy spectrum smear that includes all pixels of the energy spectrum smear not included in the first portion, each pixel with a value between zero and one, the value decreasing the further each respective pixel is from the first portion of the energy spectrum smear; and output the labeled sensor data image for detecting and tracking objects using the electromagnetic sensor.

\* \* \* \* \*